Aug. 15, 1950     H. R. HARDING     2,518,468
LUBRICATED LOCK NUT
Filed May 26, 1947

Inventor
HIRAM R. HARDING.
By Howard J. Whelan.
Attorney

Patented Aug. 15, 1950

2,518,468

UNITED STATES PATENT OFFICE 2,518,468

LUBRICATED LOCK NUT

Hiram R. Harding, Baltimore, Md., assignor of fifty per cent to Harry E. Karr, Baltimore County, Md., and twenty-five per cent to Logan C. Harding, Hopewell, Va.

Application May 26, 1947, Serial No. 750,565

2 Claims. (Cl. 151—19)

This invention relates to the art of nuts and bolts and more particularly to that pertaining to the subsidiary class of locknuts, and primarily to a method of lubricating their parts to prevent their sticking together and prevent their removal without damage.

In the conventional types of locknuts, a loose auxiliary or secondary nut is applied to a bolt having a main nut thereon and used for fastening two or more items together. The main nut serves to hold the items, while the auxiliary nut holds the main nut in place against movement. The arrangement is satisfactory when the bolts and nuts are not subject to appreciable vibration. However where there is appreciable vibration taking place through a long enough period, the friction hold of the auxiliary nut is loosened sufficiently to allow the main nut to also loosen. Then the resulting effects of loose nuts occur. The locknut in this instance serves as a delayer but does not eliminate the possibility of the eventual detachment of the nuts from the bolt, in the process of its use. This is due to the fact, that there has to be a certain amount of tolerance between the nut and the bolt threads, otherwise they could not be attached to each other. In order to increase frictional contact, spring washers are frequently used as an auxiliary to the main nut. This involves the use of an additional loose part and the inconvenience of taking care of it. Other methods are also employed and while more or less effective in making a substantial locknut frequently have the disadvantage of becoming frozen from heat or friction or rusted in so tightly as to cause the nuts and bolts to become practically welded together, especially when steel, iron or similar materials are employed. The removal of the nuts in such cases usually involves the destruction of the nut and bolt, which is often not desirable, especially when foundation or engine bolts are concerned.

It is therefore an object of this invention to provide a new and improved locknut unit that will avoid one or more of the disadvantages and limitations of the prior art.

Another object of the invention is to provide a new and improved locknut unit that will be effective as a locknut and at the same time not be subject to freezing in place.

An additional object of the present invention is to provide a new and improved locknut unit that serves in place of the conventional nut in a bolt as well as a locknut for itself in a single unit.

An additional object of the present invention is to provide lubrication means for a locknut that will prevent its parts from freezing together and prevent their removal.

Other objects will become apparent as the invention is more fully set forth.

For a clearer understanding of the invention and the principles thereof, a particular form of it is shown in the drawings by way of example. These drawings illustrate several forms, in which the invention may be constructed, while the following description outlines their structure and method of operation. The claims particularly point out the scope of the invention.

In the drawings.

In the drawings, the various parts are designated by the same reference numerals.

Figure 1:
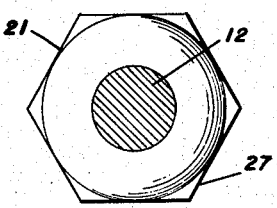
Figure 1 is a plan view of locknut unit, with the bolt in section, embodying this invention.
Figure 3:
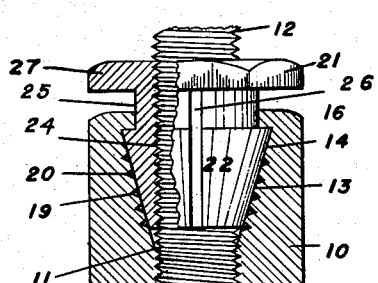
Figure 3 is a sectional elevation through the vertical axis of Figure 2.
Figure 2:
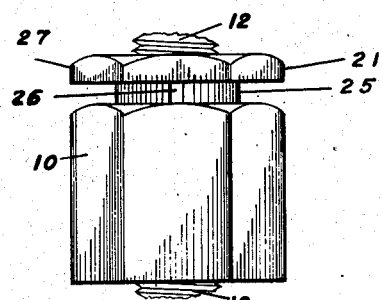
Figure 2 is a side elevation of Figure 1.
Figure 4:
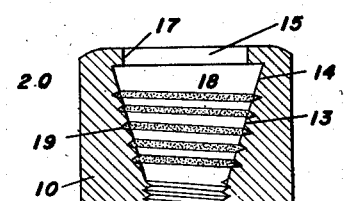
Figure 4 is a sectional view through the bonnet portion of the unit showing the lubrication means.
Figure 7:
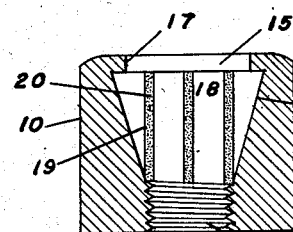
Figure 7 is a longitudinal section through another modified form of applying the lubrication means.
Figure 5:
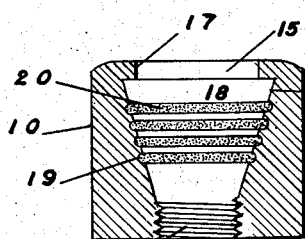
Figure 5 is a longitudinal section through a modified form of bonnet portion, otherwise similar to Figure 3.
Figure 6:
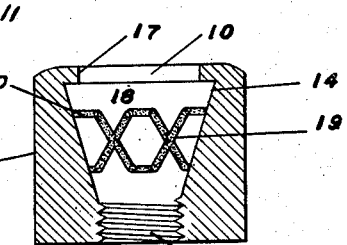
Figure 6 is a longitudinal section through another modified form of the bonnet portion.
Figure 8:
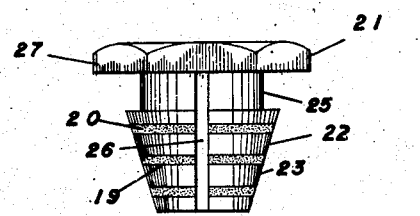
Figure 8 is a view of the lock removed from the nut showing its lubrication means.

Referring particularly to Figures 3 and 4, a main nut 10 is of conventional hexagonal exterior, longer than usual and having the internal screw threads 11 for attachment to a bolt 12, provided, and placed adjacent to the bottom portion. A bonnet portion 13 is internally formed with its wall 14 tapering inwardly towards the threads 11. An orifice 15 is arranged at the top portion 16 where the flange 17 extends inwardly from the widest portion of the tapered chamber 18. The wall 14 of the bonnet portion is grooved at 19 to provide a depression in which a lubricant material 20 preferably graphite may be inserted and held. The lubricant 20 is arranged flush with the wall. The grooves 19 may be of the several forms shown in the various sections in Figures 3, 4, 5 and 6 and 7 depending on the type preferred for the class of work on which the units are to be specifically used. The grooves 19 follow the contour of the wall and become shorter as the wall becomes restricted in its taper. The grooves 19 are spaced from each other a distance equal to that of the grooves and from the top and bottom of the bonnet chamber an amount approximately equal to the width of a plurality of grooves.

Inside the bonnet and main nut 10 is placed a lock 21 consisting of a tapered split plug 22 having a smooth peripheral wall 23, which fits into the bonnet chamber 18. The plug tends to tighten as it is screwed down further into the nut. The lock 21 is screw-threaded internally longitudinally at 24 to fit the bolt 12 and has a neck 25 extending through the orifice 15. This neck is long enough to permit the plug to be adjusted in the chamber 18 until its spacing 26 is closed due to the wedge-like action of the tapering faces.

The neck 25 is surmounted by a head 27 hexagonally symmetrical with the peripheral surfaces of the nut 10. This head 27 serves as an auxiliary adjunct for the manipulation of the lock. It is flat underneath so as to fit closely on the top surface of the main nut 10 when screwed down to its limit thereon.

The device is used on a bolt 12 with the lock and its plug located in the upper portion of the chamber 18. After the nut has been threaded on and reaches the selected position on the bolt, the lock is screwed down so its head is brought closer to the nut and the plug is wedged down on the tapered wall 14 until the spacing 26 is lessened to suit, and the plug is as tight on the screw threads of the bolt as practicable. As the plug squeezes by, it draws some of the lubricant 20 out of the grooves 19 and spreads it on the walls of the bonnet and plug. This lubricant serves to prevent them from sticking together. The resilient nature of the plug serves to open it up when loosened from the bolt and also induces a tighter fit as it is wedged down. The lock therefore serves as a binder on the bolt which is greater than that of the main bolt itself. This lessens the stresses on the main nut threads and transmits them to the plug which is more desirable.

While several forms of the invention are shown in the drawings and described in the specifications it is not desired to limit this application for patent to these particular forms or in any other way otherwise than limited by the scope thereof, as it is appreciated that other forms could be made that would use the same principles and come within the scope of the appended claims.

Having thus described the invention, what is claimed is:

1. A nut lock comprising a nut having an internal conical recess therein, a threaded portion on said nut adjacent said recess to engage a bolt, a lock nut having a conical outer periphery fitting within said recess and an internal threaded portion to engage the bolt, a head on said lock nut whereby the lock nut may be rotated within said recess, said lock nut having an axial slit, whereby it engages the bolt tightly as it is driven into said nut, said nut having internal grooves communicating with said recess and lubricant in said grooves to prevent sticking between said nut and said lock nut.

2. A nut lock comprising a nut having an internal conical recess therein, a shoulder at the upper internal end thereof and a threaded portion at the lower internal end thereof to engage a bolt, a lock nut having a conical outer periphery within said recess and an outer upper shoulder cooperating with the shoulder on said nut and a cylindrical neck portion protruding upwardly through the axial opening of said nut, a head on said lock nut whereby the lock nut may be rotated within said recess, said lock nut having an axial slit in the wall thereof and an internal threaded portion to also engage the bolt, said nut also having internal grooves communicating with said recess and lubricant in said grooves to prevent sticking between said nut and said lock nut.

HIRAM R. HARDING.

REFERENCES CITED

The following references are of record in the file of this patent:

UNITED STATES PATENTS

| Number | Name | Date |
|---|---|---|
| 783,572 | Gibbs | Feb. 28, 1905 |
| 1,025,702 | Larrad | May 7, 1912 |
| 1,085,318 | Barton | Jan. 27, 1914 |
| 2,314,207 | Grobel | Mar. 16, 1943 |